United States Patent [19]

Höhn et al.

[11] 4,311,088

[45] Jan. 19, 1982

[54] ARRANGEMENT FOR BAKING DRY FLAT BREAD

[76] Inventors: Karl Höhn, Neuköllnische Allee 54, D-1000 Berlin 44; Olaf Höhn, Auguststrasse 16, D-1000 Berlin 45; Wolfgang Höhn, Neuköllnische Allee 54, D-1000 Berlin 44, all of Fed. Rep. of Germany

[21] Appl. No.: 79,319

[22] Filed: Sep. 27, 1979

Related U.S. Application Data

[62] Division of Ser. No. 957,354, Nov. 3, 1978.

[30] Foreign Application Priority Data

Nov. 8, 1977 [DE] Fed. Rep. of Germany ....... 2750358

[51] Int. Cl.³ .................. A21D 2/00; A21D 10/00
[52] U.S. Cl. ........................ 99/470; 99/517; 99/536; 426/18
[58] Field of Search ............... 99/443 C, 467, 468, 99/470, 483, 489, 516, 517; 426/15, 18, 19

[56] References Cited

U.S. PATENT DOCUMENTS

| | | | |
|---|---|---|---|
| 2,614,935 | 10/1952 | Dienst et al. | 99/470 |
| 2,920,964 | 1/1960 | Oakes | 426/19 |
| 3,066,029 | 11/1962 | Jeffreys | 426/19 |
| 3,438,786 | 4/1969 | Wutzel | 426/19 |
| 3,788,799 | 1/1974 | Levi | 99/443 C |
| 3,910,177 | 10/1975 | Wakeman | 99/483 |

*Primary Examiner*—Philip R. Coe
*Assistant Examiner*—Timothy F. Simone
*Attorney, Agent, or Firm*—Allison C. Collard; Thomas M. Galgano

[57] ABSTRACT

An arrangement for producing dry flat bread, using flour, water and leaven, biologically fermenting the leaven by mixing flour and water and subsequently cooling mash. The mash is stored for 70 hours. The baking dough is also mixed from flour and water and leaven is added, before further cooling to below 12° C. The dough is baked in baking plate sets. Both leaven and baking dough may be pumped through a pipeline network to successive processing stations. The arrangement comprises leaven and dough storage tanks, a mixing tank, moving containers, remote-controlled valves, a heat exchanger and a cooler, all processing stations controlled from a central control panel.

4 Claims, 1 Drawing Figure

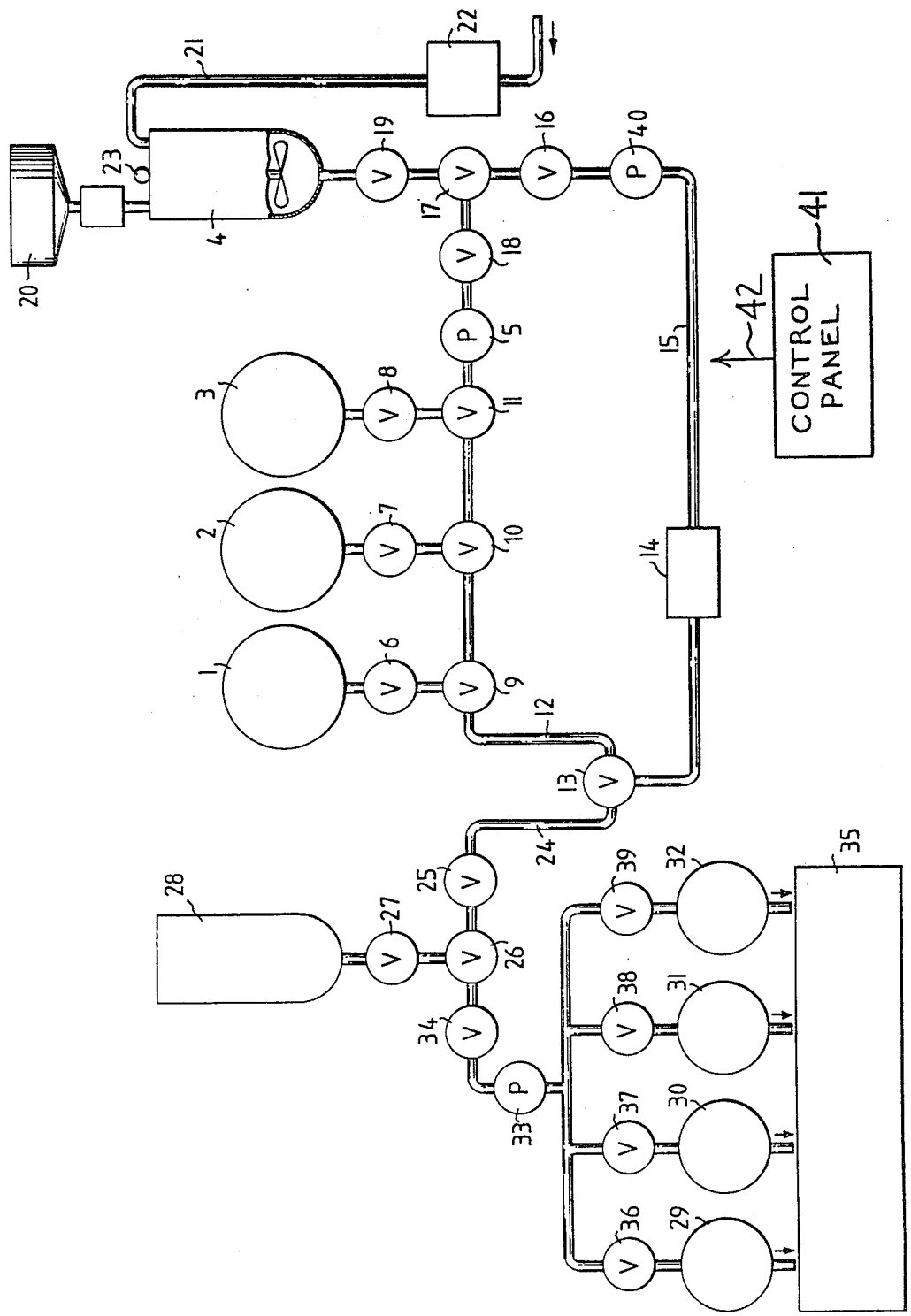

ARRANGEMENT FOR BAKING DRY FLAT BREAD

This is a division of application Ser. No. 957,354 filed Nov. 3, 1978.

BACKGROUND OF THE INVENTION

The present invention relates to an apparatus for the manufacture of dry flat bread.

Previously known dry flat breads, for example the rye wafers, always have a solid partially brittle consistency which makes consumption difficult to a large number of consumers, for example to those wearing dental fixtures. Zwieback and biscuits, however, which frequently are easier to masticate, do not come into consideration as bread substitute because of their sweet taste, and are particularly unsuitable as a base for cold cuts, fish, cheese, etc.

Accordingly, it is an object of the present invention to provide a dry flat bread which has the typical taste of bread characterized by its leaven component and is of crunchy easily masticated consistency, so as to constitute a storable baked item.

Another object of the present invention is to provide an arrangement of the foregoing character which is substantially simple in construction and may be economically fabricated.

A further object of the present invention is to provide an installation, as described, which may be readily maintained in service and which has substantially long operating life.

SUMMARY OF THE INVENTION

These objects of the present invention are achieved by a manufacturing method with the follow steps:
   (a) Preparation of the leaven by mixing flour and water in a ratio of about 1:8, with the water temperature in the range 75°–95° C. subsequent cooling of the mash to about 35° C. and storing at 20°–50° C. for about 70 hours;
   (b) Mixing the baking dough from flour and water in the ratio of 0.8:1 while adding leaven and various ingredients with a proportion below one percent by weight;
   (c) Cooling the dough to a temperature below 12° C. and
   (d) Baking the dough in baking plate sets.

Within the framework of the method according to the present invention, a biologically produced leaven is used for the first time as fermenting agent which is started anew for each batch without "injecting" the dough with a starting quantity of finished leaven. This leaven leads to a pleasant mild bread taste. A further peculiarity of the method in accordance with the present invention is the very high water content of the dough which contributes to the fact that the bread crackers baked in a baking plate set consisting of an upper and a lower plate have a loose crisp consistency even though they are so crumbleproof that they can be covered in the usual fashion with a spread.

Because of the low water content of the bread produced in accordance with the present invention it is virtually permanently storable if stored protected against harmful external influences.

In a further development of the present invention, both leaven and baking dough are delivered by means of pumps via a pipeline network of the successive processing stations. The high water content of the dough is utilized for a type of transport which facilitates fully automatic production.

According to a further inventive concept, an installation for carrying out the above stated method comprises three storage tanks for the biological leaven production, a mixing tank for the baking dough preparation, a storage tank from which the moving containers of the automatic baking oven are supplied, a pipeline network connecting the leaven storage tanks and the mixing tank, the mixing tank and the baking dough storage tank, and the baking dough storage tank and the moving containers with remote-controlled valves and a heat exchanger and a cooler, all processing stations being controlled from a central control panel.

Because three storage tanks are provided, a continuous production over periods of any length is ensured. The capacity of each of these storage tanks is dimensioned so that the leaven quantity prepared therein is sufficient for a fully day's production of the installation. If a storage tank immediately after emptying is charged with mash, the leaven can fully develop during the following three days, since another storage tank is available for the production of the next day and the day after.

The described special property of the leaven, the extremely flowable bread dough, and finally the baking of the bread dough between baking plates, similar to the known waffle irons, lead to a novel bread of mild piquant taste, which is very digestible, goes well with cold cuts and spreads of all kinds and can be stored over long periods because of the low fat and water content. Because of its low calorie content the flat bread produced in accordance with the present invention is well suited for diets including reducing diets.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

A schematic view of the installation for carrying out the method of the present invention.

DESCRIPTION OF THE PREFERRED EMBODIMENTS

Leavens are started successively in the three storage tanks 1–3 at intervals of 24 hours, consisting of water and flour under a certain temperature application. The capacity of one storage tank is dimensioned so that the biologically developed leaven quantity produced in it is sufficient for a fully daily production of the plant. Immediately after removing the last leaven portion, a new leaven is started in the storage tank just emptied in the manner described, requiring about three days for fermentation.

Assuming the storage tank 3 for one day's production has been emptied and could be filled with new mash, the leaven of storage tank 1 which had been started three days ago is available for the next day. On the day after the leaven of storage tank 2 is used, and on the third day the leaven of storage tank 3 is ready for use.

As already mentioned, the leaven, after remaining for a short period at a temperature of 75°–95° C. in the mixing tank, must be cooled to about 35° C. For this purpose, when the leaven in storage tank 3 is involved, with throughway valves 6 and 7 of storage tanks 1 and 2 closed, and via "closed" two-way valves 9 and 10 and open two-way valve 11 and through the opened throughway valve 8 leaven is placed in storage tank 3. The pump 40 is turned on and draws the leaven from the mixing tank 4 via the throughway valves 16 and 19 and pushes it through the pipeline 15 and the plate cooler 14 via the multiway valve 13 into the pipeline 12 through the closed two-way valves 9 and 10 and via the two-way valve 11 and the opened throughway valve 8 into the storage tank 3.

In order to initiate the mentioned and desired temperature differences and the proper fermenting processes, the leaven must be pumped in the meantime (within 3 days) several times through proper control of the valves through the tempered plate cooler. The procedure is precisely the same as described in the preceding paragraph.

The bread dough is prepared in mixing tank 4. Via the flour weighing station 20, the flour is pumped into it, and via the pipeline 21 the water cooled beforehand in a plate cooler (not shown). Finally the leaven is added via pump 5. The leaven, which is taken, for example, from storage tank 3, flows through the throughway valve 8 and the two-way valve 11 and valves 18, 17 and 19 into this mixing tank 4 in which the agitator 23 is installed.

After the mixing tank has been loaded, its agitator 23 is turned on and the bread dough is homogenized. After closing throughway valve 18 and opening throughway valve 19 and two-way valve 17 and throughway valve 16 and the plate cooler 14, where it is cooled to the required storage temperature, it is delivered through the properly set multiway valve 13 and pipeline 24 and the opened throughway valve 25, the two-way valve 26 and the throughway valve 27 to storage tank 28 which is thus supplied with the amount required for one day's production.

Then the throughway valve 25 is closed, and the moving containers 29–32 are continually supplied under the delivery pressure of pump 33 after opening throughway valve 34, according to the band feed of automatic baking oven 35 whose baking plate sets (not shown) are intermittently filled with bread dough. The intermittent bread dough delivery is controlled via valves 36–39. All processing stations are operated from a central control panel 41 by outputs 42.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. An apparatus for producing dry flat bread from dough having only water and flour with addition of leaven comprising: three leaven storage tanks for biological leaven production, one mixing tank for preparing either leaven or baking dough, one baking dough storage tank, automatic baking oven means with containers for temporary storage, said baking dough storage tank supplying said containers; a pipeline network for connecting by remote controlled valve means said leaven storage tanks to said mixing tank, said mixing tank to said baking dough storage tank, and said baking dough storage tank to said temporary storage containers; a heat exchanger and a cooler in said pipeline network located between said mixing tank and said leaven storage tanks, said heat exchanger and cooler further located between said mixing tank and said baking dough storage tank; each of said leaven storage tank, baking dough storage tank, mixing tank, temporary storage containers, heat exchanger and cooler comprising processing stations; and a central control panel for controlling said processing stations, said leaven being maintained in said storage tanks for a predetermined period of time at a defined temperature within a predetermined temperature range, the capacities of the bread-dough and leaven containers being dependent on processing times for producing uninterrupted and continuous operation, predetermined amounts of dough and leaven being portioned out from said temporary storage containers prior to entering said baking oven means, said bread being produced by spontaneous chemical fermentation free from the use of bacteria.

2. Apparatus as defined in claim 1 including pump means for conducting both leaven and baking dough to successive processing stations.

3. Apparatus as defined in claim 1 wherein leaven is prepared by mixing flour and water in a ratio of substantially 1:8, water temperature being in a temperature range of 75°–95° C., mash being subsequently cooled to substantially 35° C., and stored at 20°–50° C. for substantially 70 hours, baking dough being mixed from flour and water in a ratio of 0.8:1, leaven and various ingredients being added with a proportion of less than one percent by weight, dough being thereafter cooled to a temperature below 12° C., and baking plate sets for baking dough therein.

4. Apparatus as defined in claim 1, wherein leavens are started successively in three storage tanks at intervals of 24 hours, the capacity of one storage tank being dimensioned so that the biologically developed leaven quantity in the storage tank is sufficient for a full daily production, a new leaven being started in the storage tank that was emptied immediately after removing the last leaven portion requiring substantially three days for fermentation, when a third one of said storage tanks has been emptied and is subsequently filled with new mash, the leaven of a first one of said storage tanks which had been started three days ago is available for the next day, the leaven of a second one of said storage tanks being used on the subsequent day and the leaven in the third storage tank being available for use on the third day, said leaven being pumped a plurality of times through said pipe line network and through said cooler within three days for maintaining predetermined temperature differences and fermenting processes, the flour being pumped from a weighing station into a mixing tank in which the bread dough is prepared, cooled water being lowered into said mixing tank, leaven being pumped from a storage tank into said mixing tank and the mixture therein being agitated so that the bread dough is homogenized, the contents from the mixing tank being pumped after cooling to an auxiliary storage tank.

* * * * *